(12) United States Patent
Lee et al.

(10) Patent No.: US 10,563,826 B2
(45) Date of Patent: Feb. 18, 2020

(54) MULTIPURPOSE ASSISTANCE LAMP WITH OLED LIGHTING SHEET HOUSING STRUCTURE

(71) Applicant: LG Display Co., Ltd., Seoul (KR)

(72) Inventors: Jung Hyoung Lee, Daejeon (KR); Jong Seok Kim, Daejeon (KR); Hye Cho Shin, Daejeon (KR); Seung Chul Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/508,660

(22) PCT Filed: Sep. 3, 2014

(86) PCT No.: PCT/KR2014/008249
§ 371 (c)(1),
(2) Date: Mar. 3, 2017

(87) PCT Pub. No.: WO2016/035905
PCT Pub. Date: Mar. 10, 2016

(65) Prior Publication Data
US 2017/0284613 A1    Oct. 5, 2017

(51) Int. Cl.
*F21L 4/00*    (2006.01)
*F21L 4/02*    (2006.01)
(Continued)

(52) U.S. Cl.
CPC ............... *F21L 4/02* (2013.01); *F21L 4/00* (2013.01); *F21S 9/02* (2013.01); *F21S 9/022* (2013.01);
(Continued)

(58) Field of Classification Search
CPC ..... F21V 21/0965; F21V 15/01; F21V 15/013; F21V 15/015; F21S 9/02; F21S 9/022;
(Continued)

(56) References Cited

U.S. PATENT DOCUMENTS

2003/0193795 A1  10/2003  Brown
2004/0062055 A1* 4/2004  Rozenberg ............. F21S 8/024
                                                    362/555
(Continued)

FOREIGN PATENT DOCUMENTS

CN    201259112 Y    6/2009
CN    201696947 U    1/2011
(Continued)

OTHER PUBLICATIONS

International Search Report dated Apr. 13, 2015, for corresponding International Patent Application No. PCT/KR2014/008249.
(Continued)

*Primary Examiner* — Anh T Mai
*Assistant Examiner* — Steven Y Horikoshi
(74) *Attorney, Agent, or Firm* — Morgan, Lewis & Bockius LLP (57) ABSTRACT

The present invention relates to a multipurpose assistance lamp which includes: a lighting unit which includes a transparent film and a casing plate which are disposed on a front surface and a back surface of an OLED lighting sheet, respectively; and a back housing which is attached to a back surface of the casing plate, and accommodates therein a circuit part and a battery for operating the OLED lighting sheet, thereby minimizing a thickness and providing light having improved brightness, by adopting an OLED as a light source.

3 Claims, 7 Drawing Sheets (51) Int. Cl.
*F21V 15/01* (2006.01)
*F21S 9/02* (2006.01)
*F21V 3/02* (2006.01)
*F21V 21/096* (2006.01)
*F21Y 105/16* (2016.01)
*F21Y 115/15* (2016.01)

(52) U.S. Cl.
CPC ............... *F21V 3/02* (2013.01); *F21V 15/01* (2013.01); *F21V 21/0965* (2013.01); *F21Y 2105/16* (2016.08); *F21Y 2115/15* (2016.08); Y02B 20/36 (2013.01)

(58) Field of Classification Search
CPC . F21L 4/00; F21L 4/005; H05B 33/02; H05B 33/04; H05B 33/12; G02F 1/133608; G02F 2001/133328; F21Y 2105/16; Y02B 20/36
See application file for complete search history.

(56) References Cited

U.S. PATENT DOCUMENTS

| | | | | |
|---|---|---|---|---|
| 2010/0007449 | A1* | 1/2010 | Tait | H01F 7/0221 335/286 |
| 2010/0290240 | A1* | 11/2010 | Genenbacher | F21V 19/0005 362/398 |
| 2010/0315252 | A1 | 12/2010 | Desphande et al. | |
| 2011/0216531 | A1 | 9/2011 | Yeh | |
| 2011/0242743 | A1* | 10/2011 | Moon | H05K 5/02 361/679.01 |
| 2011/0249450 | A1 | 10/2011 | Ngai | |
| 2012/0007509 | A1 | 1/2012 | Bosnjak et al. | |
| 2012/0170244 | A1* | 7/2012 | Kwon | G06F 1/1637 361/829 |
| 2013/0050820 | A1* | 2/2013 | Shin | G06F 1/1601 359/465 |
| 2013/0051078 | A1 | 2/2013 | Kotera et al. | |
| 2013/0301249 | A1 | 11/2013 | Ngai et al. | |
| 2014/0016308 | A1 | 1/2014 | Kubota et al. | |
| 2014/0078752 | A1 | 3/2014 | Gaerditz et al. | |
| 2014/0140023 | A1 | 5/2014 | Lee et al. | |
| 2014/0176854 | A1 | 6/2014 | Shin et al. | |
| 2015/0035431 | A1* | 2/2015 | Lee | H01L 51/5253 313/504 |

FOREIGN PATENT DOCUMENTS

| | | |
|---|---|---|
| JP | H04-363806 A | 12/1992 |
| JP | 2004-319373 A | 11/2004 |
| JP | 2010-040269 A | 2/2010 |
| JP | 2013-051055 A | 3/2013 |
| JP | 2013-182824 A | 9/2013 |
| JP | 2014-143148 A | 8/2014 |
| KR | 10-1187560 B1 | 10/2012 |
| TW | 201244210 A | 11/2012 |
| TW | M452088 U1 | 5/2013 |
| TW | M474196 U | 3/2014 |
| TW | 201426093 A | 7/2014 |

OTHER PUBLICATIONS

Office Action dated Sep. 4, 2018, issued in counterpart Japanese Patent Application No. 2017-511618.
Office Action dated Jan. 22, 2019, issued in counterpart Chinese Patent Application No. 201480081742.X.
Office Action dated Sep. 9, 2019, issued in counterpart Chinese Patent Application No. 201480081742.X.

* cited by examiner

MULTIPURPOSE ASSISTANCE LAMP WITH OLED LIGHTING SHEET HOUSING STRUCTURE

TECHNICAL FIELD

The present invention relates to a multipurpose assistance lamp, and more particularly, to a multipurpose assistance lamp which includes: a lighting unit which includes a transparent film and a casing plate which are disposed on a front surface and a back surface of an OLED lighting sheet, respectively; and a back housing which is attached to a back surface of the casing plate, and accommodates therein a circuit part and a battery for operating the OLED lighting sheet, thereby minimizing a thickness and providing light having improved brightness, by adopting an OLED as a light source.

BACKGROUND ART

A lamp in the related art, which is installed in a bedroom or a living room inside a building, has a structure fixedly mounted on a wall surface or a ceiling, and as a result, it is impossible to move the lamp, and it is sometimes impossible to position the lamp to a necessary location.

Accordingly, the present invention presents a multipurpose assistance lamp which may serve to perform a lighting function by mounting the multipurpose assistance lamp at various locations inside a building by a user as necessary. Of course, the multipurpose assistance lamp may be used for leisure, such as for use on a camping trip, and fishing outdoors.

A portable assistance lamp such as a flashlight may be exemplified as the related art associated with the multipurpose assistance lamp of the present invention, but the portable assistance lamp in the related art is just a lamp that is used at the time of an emergency such as power failure when considering the use inside a building, and therefore, the portable assistance lamp is different from the present invention.

Meanwhile, a filament type bulb has been used as a portable assistance lamp in the related art, but recently, as a lighting means being developed, new products adopting new and various lighting means such as an LED light-emitting diode have been launched. In particular, an organic light-emitting diode (OLED), which is being developed most recently, has an advantage in terms of high brightness, a thin film structure, and bendability, and as a result, the organic light-emitting diode is applied to various image devices such as a TV set.

Accordingly, the present invention adopts the OLED, which may implement high brightness and a thin film structure, as a lighting means, and presents a multipurpose assistance lamp which has more improved brightness than the portable assistance lamp in the related art, and is more slim and elegant in design than the portable assistance lamp in the related art.

DISCLOSURE

Technical Problem

The present invention has been made in an effort to provide a multipurpose assistance lamp which make a lighting unit thin by combining a thin film type OLED lighting sheet, a transparent film, and a casing plate, thereby minimizing a thickness, and emitting light having improved brightness.

In addition, the present invention has been made in an effort to provide a multipurpose assistance lamp which includes a lighting unit capable of changing a radius of curvature by using an OLED lighting sheet and a transparent film having flexibility as a light source of a lighting unit.

Technical Solution

An exemplary embodiment of the present invention provides a multipurpose assistance lamp including: a lighting unit which has an OLED lighting sheet, a transparent film that is in surface-to-surface contact with a front surface of the OLED lighting sheet while being stacked on the front surface of the OLED lighting sheet, and a casing plate that accommodates and supports the OLED lighting sheet and the transparent film using left and right edges, while being in surface-to-surface contact with a back surface of the OLED lighting sheet; and a back housing which is attached to a back surface of the casing plate, and accommodates therein a circuit part and a battery for operating the OLED lighting sheet.

Here, the casing plate may include a back cover portion which is in surface-to-surface contact with the back surface of the OLED lighting sheet, side protruding end portions which vertically protrude from both surfaces of the back cover portion which face each other, to support the OLED lighting sheet and the transparent film at sides of the side protruding end portions, and guide arm portions which are extended inward from the side protruding end portions so as to be parallel with a front surface of the back cover portion, and in contact with and support surfaces at edges of the transparent film.

In this case, the lighting unit may be formed in a rectangular shape, and both sides of the lighting unit, which are orthogonal to the side protruding end portions, may be formed as free end portions, such that finishing plugs may be fitted into and coupled to the free end portions in order to prevent the OLED lighting sheet and the transparent film accommodated in the casing plate from being exposed to the outside.

Further, the casing plate may include a back cover portion which is in surface-to-surface contact with the back surface of the OLED lighting sheet, and side frame portions which are attached to both edges of the back cover portion which at least face each other, vertically protrude toward the front surface, and are in contact with and support respective edges of the OLED lighting sheet and the transparent film at inner sides of the side frame portions toward a front surface of the back cover portion.

In this case, in the side frame portion, a first vertical end portion which is in direct contact with and supports a side edge of the back cover portion, a second vertical end portion which is in direct contact with and supports a side edge of the OLED lighting sheet, and a third vertical end portion which is in direct contact with and supports a side edge of the transparent film may be sequentially formed.

Furthermore, the side frame portion may further have a first horizontal end portion which is formed between the first vertical end portion and the second vertical end portion, and attached to the edge of the front surface of the back cover portion, and a second horizontal end portion which is formed between the second vertical end portion and the third vertical end portion, and attached to the edge of the back surface of the transparent film.

Meanwhile, the transparent film may include a front cover portion that is in surface-to-surface contact with the front surface of the OLED lighting sheet, and side end portions which vertically protrude from both side surfaces of the front cover portion which face each other, to support the OLED lighting sheet at sides of the side end portions, and the casing plate may include a back cover portion which is in surface-to-surface contact with the back surface of the OLED lighting sheet, and side protruding end portions which vertically protrude from both side surfaces of the back cover portion which face each other, to support the side end portions at sides of the side protruding end portions.

In this case, the side end portion of the transparent film may have a plurality of catching projections that protrudes in a longitudinal direction thereof, and the side protruding end portion of the casing plate may have catching recessed portions formed at positions corresponding to the plurality of catching projections.

Meanwhile, the back housing may have a magnetic body provided on a back surface thereof so that the back housing is attached to an outside article.

In this case, the magnetic bodies may be attached to the inside and the outside of the back surface of the back housing, and the outside magnetic body may be detachably provided on the back surface.

Advantageous Effects

As described above, the multipurpose lamp according to the present invention may have more improved brightness than an assistance lamp in the related art by making a lighting unit thin by combining the OLED lighting sheet, the transparent film, and the casing plate, and may be more slim and elegant in design than the assistance lamp in the related art.

In addition, the multipurpose assistance lamp according to the present invention may be used as a mood lamp in a bedroom or a living room inside a building, or may be conveniently used suitably for use and a position desired by a user for leisure such as for use on a camping trip and fishing outdoors.

In addition, there was a problem in that in a case in which components are attached by the existing screws, a double-sided tape, or the like when the lighting unit is assembled, a volume and a thickness increase, the number of working processes is increased, and a defect rate is high, but the lighting unit according to the present invention is assembled by a simple method of merely fitting the OLED lighting sheet and the transparent film into the casing plate or inserting the OLED lighting sheet and the transparent film into the casing plate in a sliding manner, thereby reducing a volume and a thickness, reducing the number of working processes, and greatly reducing a defect rate of a product according to assembly.

Furthermore, according to characteristics of the OLED, the multipurpose assistance lamp may provide light close to natural light that could not be implemented by the existing filament type bulb, LEDs, and the like, and electrical power consumption may also be greatly decreased, thereby implementing an environmentally-friendly multipurpose assistance lamp.

In addition, the OLED lighting sheet may be applied to a three-dimensionally curved shape by bending the OLED lighting sheet, and as a result, the lighting unit, which has a shape with a radius of curvature such as a concave or convex shape, may be implemented, such that there is an advantage in that various designs may be implemented.

MODE FOR INVENTION

Figure 1:
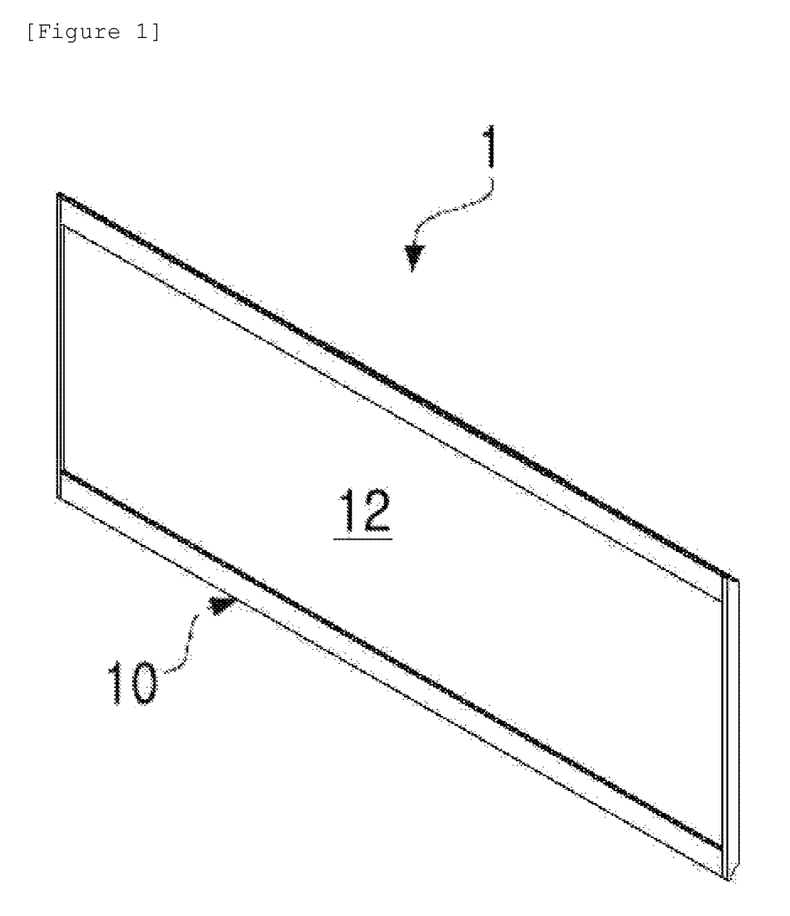
FIG. 1 is a perspective view of a multipurpose assistance lamp according to a first exemplary embodiment of the present invention.
Figure 2:
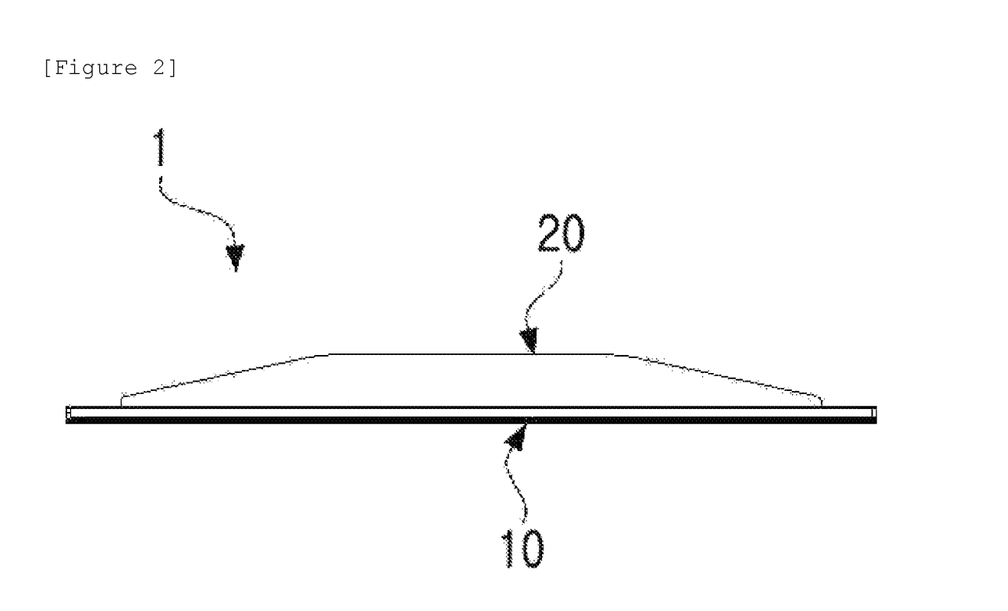
FIG. 2 is a top plan view of the multipurpose assistance lamp of FIG. 1.

As illustrated in FIGS. 1 and 2, a multipurpose assistance lamp 1 according to a first exemplary embodiment of the present invention includes a lighting unit 10 which has a rectangular thin plate shape, and a back housing 20 which is attached to a back surface of the lighting unit 10 and supports the lighting unit 10.

Figure 3:
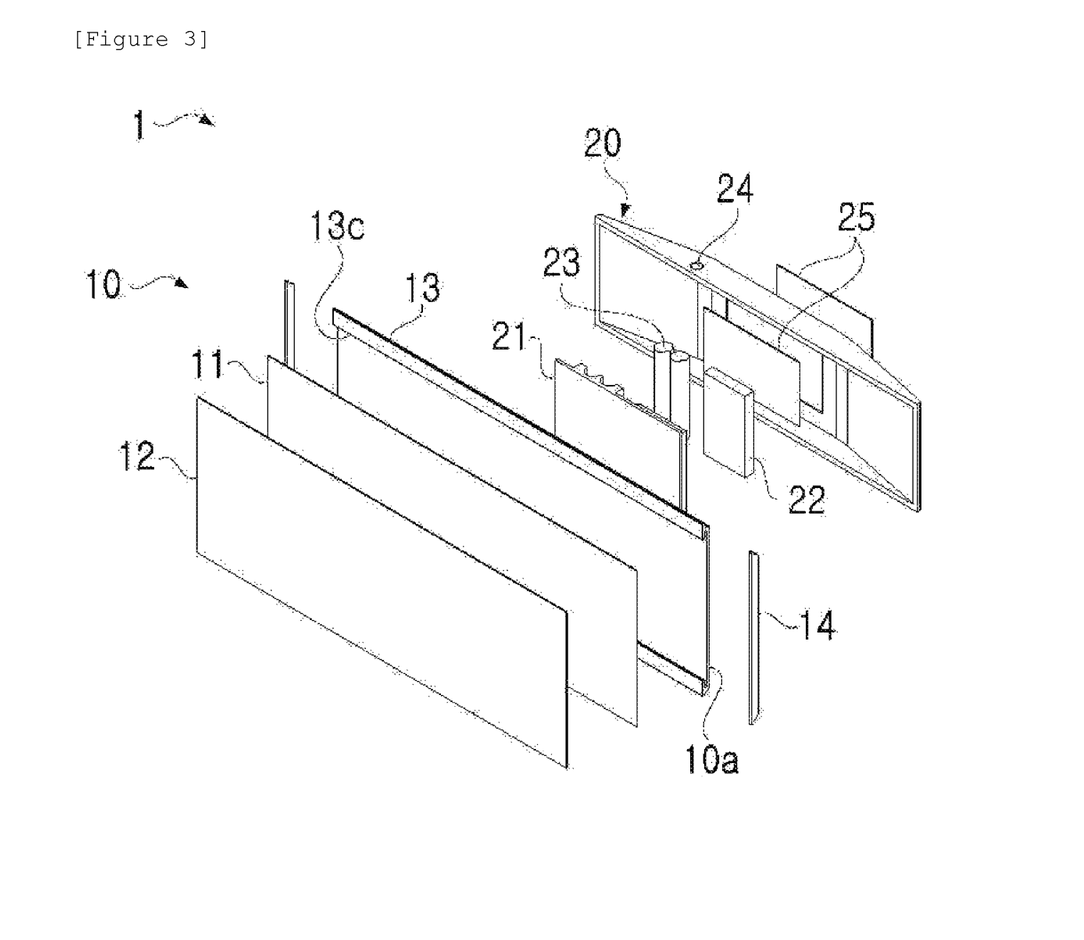
FIG. 3 is an exploded perspective view of the multipurpose assistance lamp of FIG. 1.

As illustrated in FIG. 3, the lighting unit 10 includes an OLED lighting sheet 11 in the form of a rectangular thin film as a lighting means, and includes a rectangular transparent film 12 which is in surface-to-surface contact with a front surface of the OLED lighting sheet 11 while being stacked on the front surface of the OLED lighting sheet 11. The transparent film 12 allows light generated from the OLED lighting sheet 11 to pass therethrough, and serves to protect the OLED lighting sheet 11 from external impact.

In addition, the lighting unit 10 further includes a rectangular casing plate 13 which accommodates and supports the OLED lighting sheet 11 and the transparent film 12.

Figure 4:
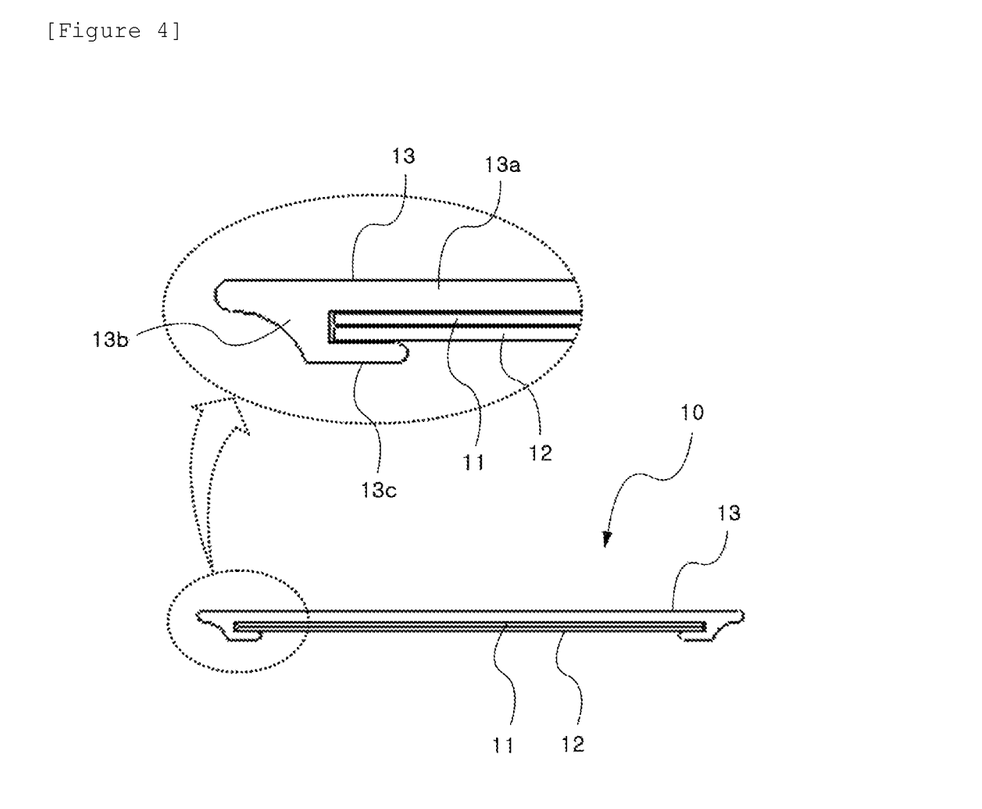
FIG. 4 is a cross-sectional view of a lighting unit that is a constituent element of the multipurpose assistance lamp of FIG. 1.

As illustrated in FIG. 4, the casing plate 13 accommodates and supports the OLED lighting sheet 11 and the transparent film 12 using left and right edges of the casing plate 13, while being in surface-to-surface contact with a back surface of the OLED lighting sheet 11.

Specifically, the casing plate 13 includes a back cover portion 13a which is in surface-to-surface contact with the back surface (upper surface in FIG. 4) of the OLED lighting sheet 11, side protruding end portions 13b which vertically protrude from both side surfaces of the back cover portion 13a which oppose each other, and guide arm portions 13c which are extended inward from the side protruding end portions 13b so as to be parallel with the front surface of the back cover portion 13a.

The side protruding end portions 13b support the OLED lighting sheet 11 and the transparent film 12, which are vertically stacked, at sides of the side protruding end portions 13b, and the guide arm portions 13c are in contact with and support surfaces (bottom surfaces in FIG. 4) at edges of the transparent film 12, such that the OLED lighting sheet 11 and the transparent film 12 are accommodated and supported together in internal spaces which are formed by the guide arm portions 13c and the back cover portion 13a.

The casing plate 13 may be implemented by extrusion forming of aluminum, and the lighting unit 10 may be assembled in a way that the OLED lighting sheet 11 and the transparent film 12 are fitted into the casing plate 13 from one end portion in a longitudinal direction of the casing plate 13.

Meanwhile, as illustrated in FIG. 3, finishing plugs 14 having a thin rod shape are fitted into and coupled to left and right free end portions 10a of the casing plate 13 into which the OLED lighting sheet 11 and the transparent film 12 are fitted, thereby preventing the OLED lighting sheet 11 and the transparent film 12, which are fitted into and accommodated in the casing plate 13, from being exposed to the outside through the free end portions 10a.

As illustrated in FIGS. 2 and 3, the back housing 20 is attached to a back surface of the casing plate 13, and accommodates therein a circuit part 21 and batteries 22 and 23 for operating the OLED lighting sheet 11. As the batteries 22 and 23, a Li-ion battery 22, which is used for a mobile phone and the like, is provided, such that a charging device for the mobile phone may be used as it is, and in addition to the Li-ion battery 22, a separate general dry cell 23 may be used while being replaced. A switch 24 for an operation of a user is installed on an outer plate surface of the back housing 20.

In addition, a connector (not illustrated in the drawings) for supplying electric power to the Li-ion battery 22 is provided on the back housing 20, such that the multipurpose assistance lamp 1 may also be used in a state in which electric power is supplied through an electric wire from the outside.

The back housing 20 also serves as a handle of the multipurpose assistance lamp 1, and may be formed as an injection-molded product made of plastic.

In addition, as illustrated in FIG. 3, plate magnets 25 are provided inside and outside a back surface of the back housing 20, such that the multipurpose assistance lamp 1 may be attached to an outside article made of steel after the user turns on the switch 24.

Particularly, the outer plate magnet 25 may be provided to be separable from the back housing 20, such that the entire lamp 1 may be fixed to a tent by attaching the inner and outer plate magnets 25 to each other while interposing a thin film of the tent between the inner and outer plate magnets 25.

Figure 5:
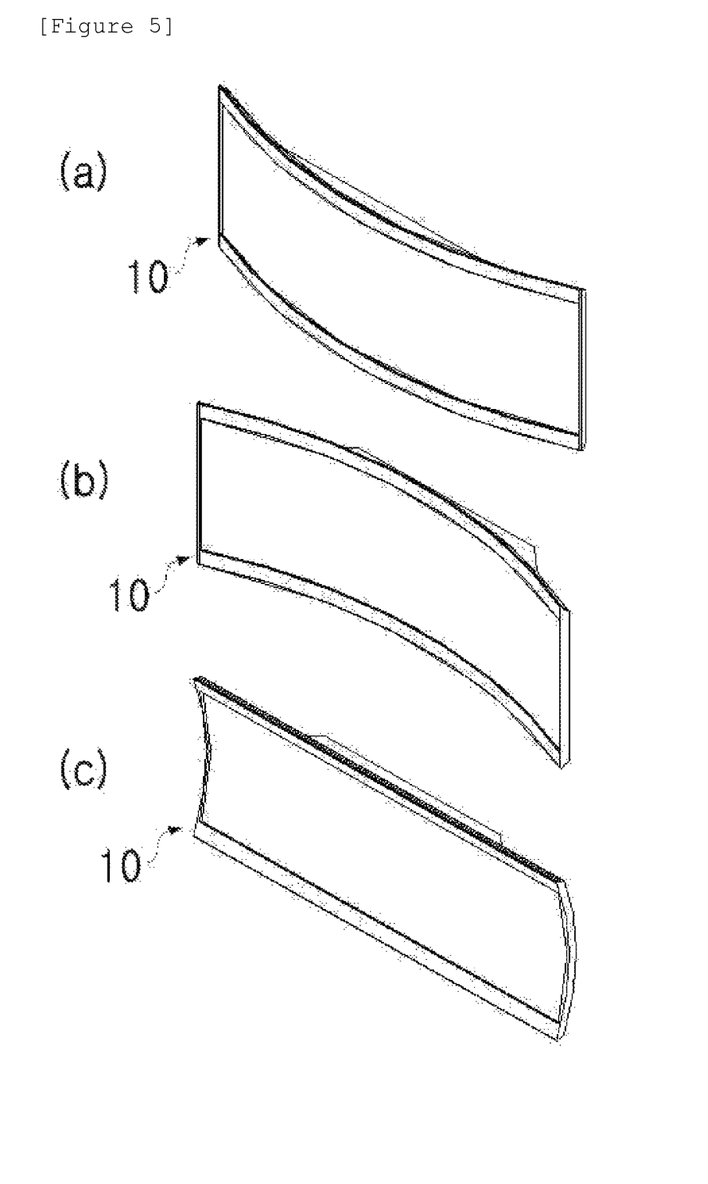
FIG. 5 is a perspective view illustrating modified examples of the multipurpose assistance lamp of FIG. 1.

Meanwhile, with a flexibility of the OLED lighting sheet 11 that is applied to the lighting unit 10 as a light source as described above, the lighting unit 10 itself may be applied to a three-dimensionally curved shape by bending the OLED lighting sheet 11 as necessary, as illustrated in FIG. 5 for example. Therefore, by using the flexibility of the OLED lighting sheet 11, it is possible to implement the lighting unit 10 which can have various designs by taking advantage of a radius of curvature such as three-dimensionally convex (FIG. 5A) and concave (FIGS. 5B and 5C) shapes.

Figure 6:
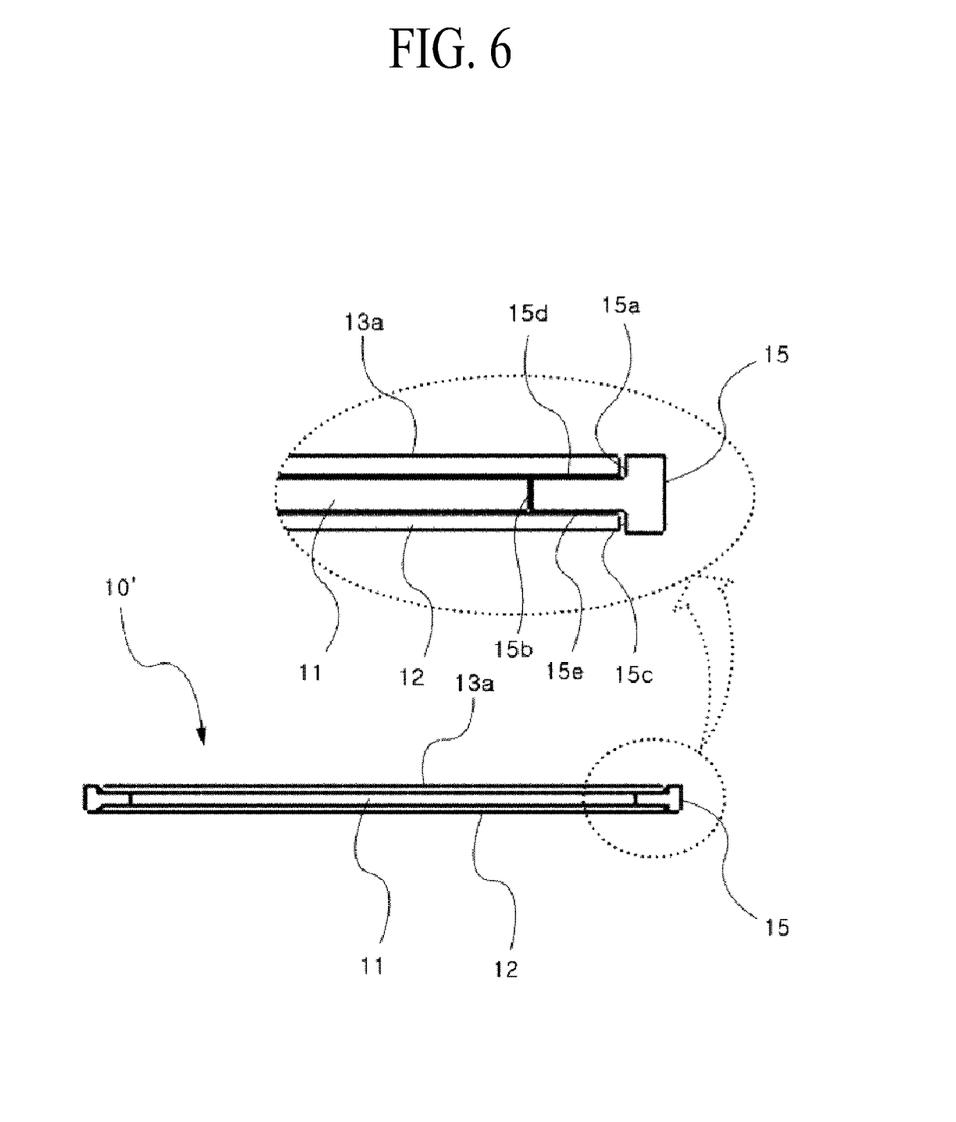
FIG. 6 is a cross-sectional view of a lighting unit that is a constituent element of a multipurpose assistance lamp according to a second exemplary embodiment of the present invention.

In a lighting unit 10' of a multipurpose assistance lamp according to a second exemplary embodiment of the present invention, a casing plate includes a back cover portion 13a, and side frame portions 15, as illustrated in FIG. 6.

The back cover portion 13a is in surface-to-surface contact with and supports the back surface (upper surface in the drawing) of the OLED lighting sheet 11, the side frame portions 15 are attached to both side surfaces at edges of a front surface (lower surface in the drawing) of the back cover portion 13a, which face each other, and vertically protrude toward the front surface, and the side frame portions 15 are in contact with and support respective edges of the OLED lighting sheet 11 and the transparent film 12 at inner sides of the side frame portions 15 toward a front surface of the back cover portion 13a.

Specifically, the side frame portions 15 have a cross section having a rotated 'T' shape, respectively, in which first vertical end portions 15a which are in direct contact with and support both edges of the back cover portion 13a, second vertical end portions 15b which are in direct contact with and support both edges of the OLED lighting sheet 11, and third vertical end portions 15c which are in direct contact with and support both edges of the transparent film 12 are sequentially formed.

Furthermore, the side frame portion 15 is attached to the edge of the front surface of the back cover portion 13a by a first horizontal end portion 15d formed between the first vertical end portion 15a and the second vertical end portion 15b, and attached to the edge of the back surface of the transparent film 12 through a second horizontal end portion 15e formed between the second vertical end portion 15b and the third vertical end portion 15c.

Here, the back cover portion 13a may be made of stainless steel or carbon, and the side frame portion 15 may be formed as an injection-molded product made of aluminum.

Figure 7:
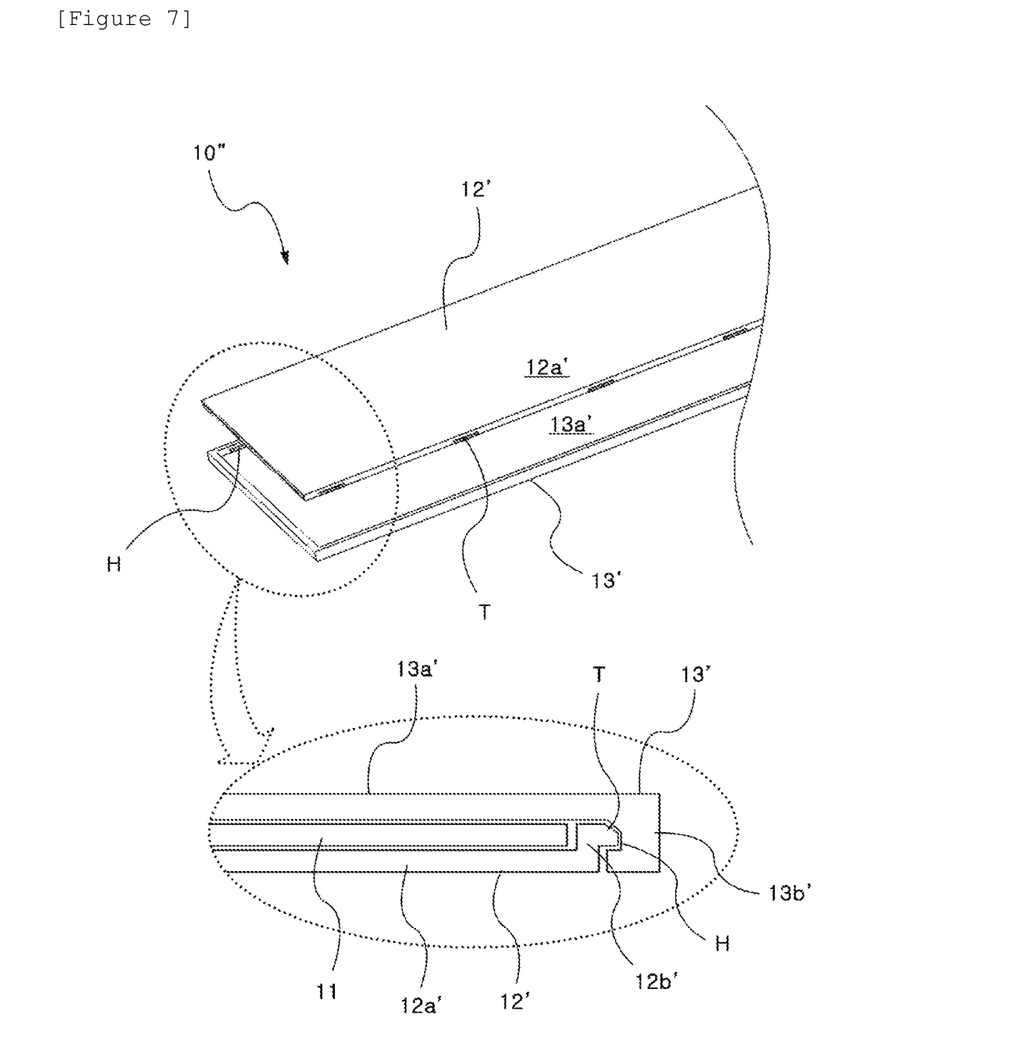
FIG. 7 is a cross-sectional view of a lighting unit that is a constituent element of a multipurpose assistance lamp according to a third exemplary embodiment of the present invention.

As illustrated in FIG. 7, a lighting unit 10" of a multipurpose assistance lamp according to a third exemplary embodiment of the present invention includes a rectangular transparent film 12' which is in surface-to-surface contact with a front surface of an OLED lighting sheet 11 while being stacked on the front surface of the OLED lighting sheet 11, and a rectangular casing plate 13' which accommodates and supports the OLED lighting sheet 11 and the transparent film 12' at sides of the casing plate 13'.

The transparent film 12' includes a front cover portion 12a' which is in surface-to-surface contact with a front surface (bottom surface in the drawings) of the OLED lighting sheet 11, and side end portions 12b' which vertically protrude from both left and right side surfaces of the front cover portion 12a' to support the OLED lighting sheet 11 at sides of the side end portions 12b'.

The casing plate 13' includes a back cover portion 13a' which is in surface-to-surface contact with a back surface (upper surface in the drawing) of the OLED lighting sheet 11, and side protruding end portions 13b' which vertically protrude from both side surfaces of the back cover portion 13a', which face each other, to support the side end portions 12b' at sides of the side protruding end portions 13b'.

Accordingly, the lighting unit 10" has a thickness of the structure that is configured with only three layers: the OLED lighting sheet 11, the transparent film 12', and the casing plate 13', and as a result, the lighting unit, which is thinner than the lighting unit (10 in FIG. 4) of the first exemplary embodiment that adopts a slide assembly manner, may be implemented.

In this case, as illustrated in FIG. 7, a plurality of catching projections T protrudes in a longitudinal direction of the side end portion 12b' of the transparent film 12', and catching recessed portions H are formed at positions of the side protruding end portion 13b' of the casing plate 13', which correspond to the plurality of catching projections T, such that the catching projections T and the catching recessed portions H may be fastened to each other when assembled.

Meanwhile, the aforementioned multipurpose assistance lamps are merely the exemplary embodiments for helping the understanding of the present invention, and it should be understood that the scope or the technical scope of the present invention is not limited to the aforementioned description.

The invention claimed is:

1. A multipurpose assistance lamp with an OLED lighting sheet housing structure, comprising:
   a lighting unit which has an OLED lighting sheet, a transparent film that is in surface-to-surface contact with a front surface of the OLED lighting sheet while being stacked on the front surface of the OLED lighting sheet, and a casing plate that accommodates and supports the OLED lighting sheet and the transparent film using left and right edges, while being in surface-to-surface contact with a back surface of the OLED lighting sheet; and
   a back housing which is attached to a back surface of the casing plate, and accommodates therein a circuit part and a battery for operating the OLED lighting sheet,
   wherein the lighting unit itself has a curved shape by bending the OLED lighting sheet,
   wherein a front surface of the transparent film is exposed to an exterior and a back surface of the transparent film directly contacts with the front surface of the OLED lighting sheet,
   wherein the transparent film has a single layer structure,
   wherein the casing plate includes a back cover portion which is in surface-to-surface contact with the back surface of the OLED lighting sheet, and side frame portions which are attached to left and right edges of the back cover portion which at least face each other, and
   wherein one of the side frame portions comprises:
      a first vertical end portion which is in direct contact with and supports a side edge of the back cover portion;
      a second vertical end portion which is in direct contact with and supports a side edge of the OLED lighting sheet;
      a third vertical end portion which is in direct contact with and supports a side edge of the transparent film;
      a first horizontal end portion which is formed between the first vertical end portion and the second vertical end portion, and attached to the edge of the front surface of the back cover portion; and
      a second horizontal end portion which is formed between the second vertical end portion and the third vertical end portion, and attached to the edge of the back surface of the transparent film.

2. The multipurpose assistance lamp with an OLED lighting sheet housing structure of claim 1, wherein the back housing has a magnetic body and the back housing is attached to an outside article by using the magnetic body.

3. The multipurpose assistance lamp with an OLED lighting sheet housing structure of claim 2, wherein the magnetic body comprises:
   an inside magnetic body disposed inside the back housing; and
   an outside magnetic body disposed the outside of the back housing,
   wherein the outside magnetic body is detachably provided on the back surface.

* * * * *